Feb. 9, 1971   L. E. FULLER ET AL   3,561,206
HARVESTER TINE

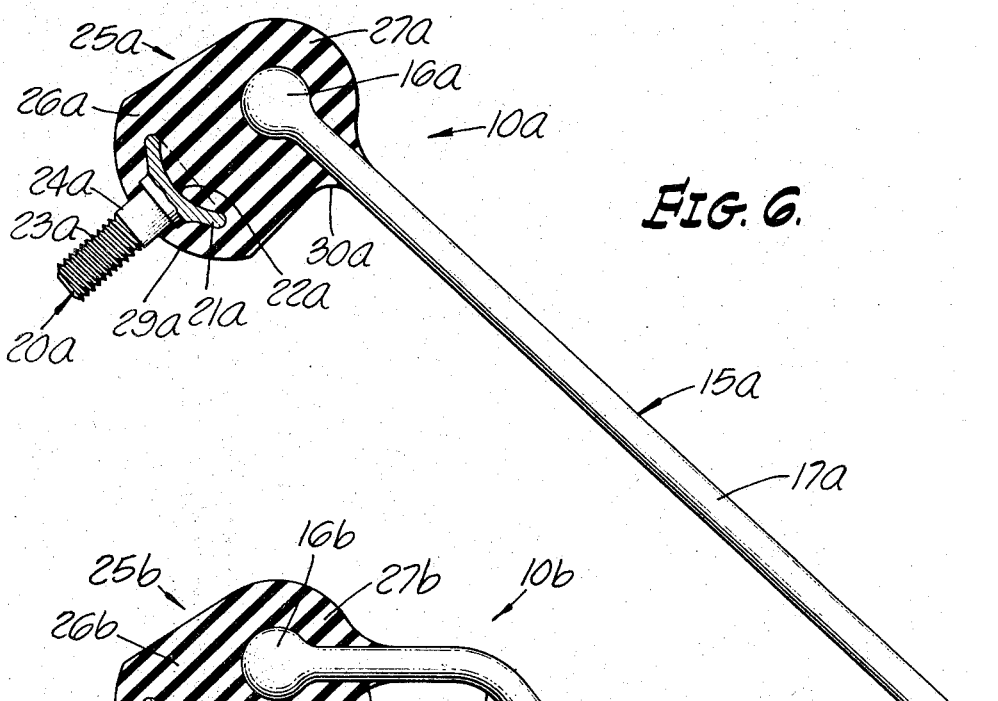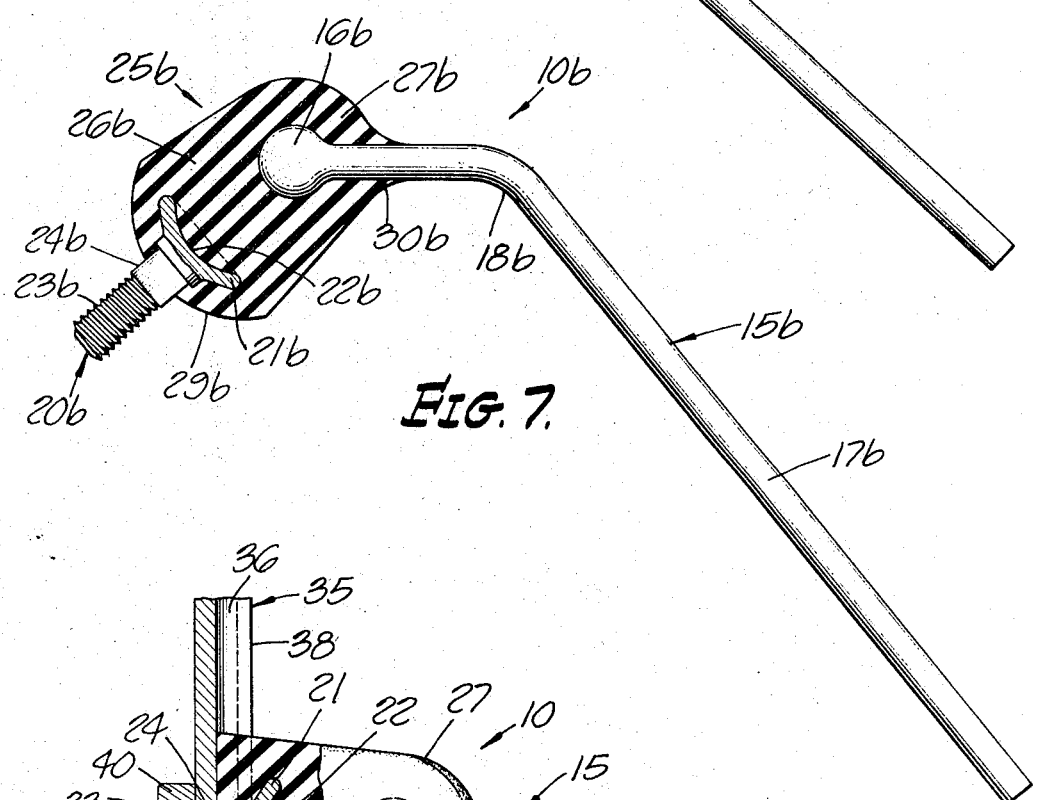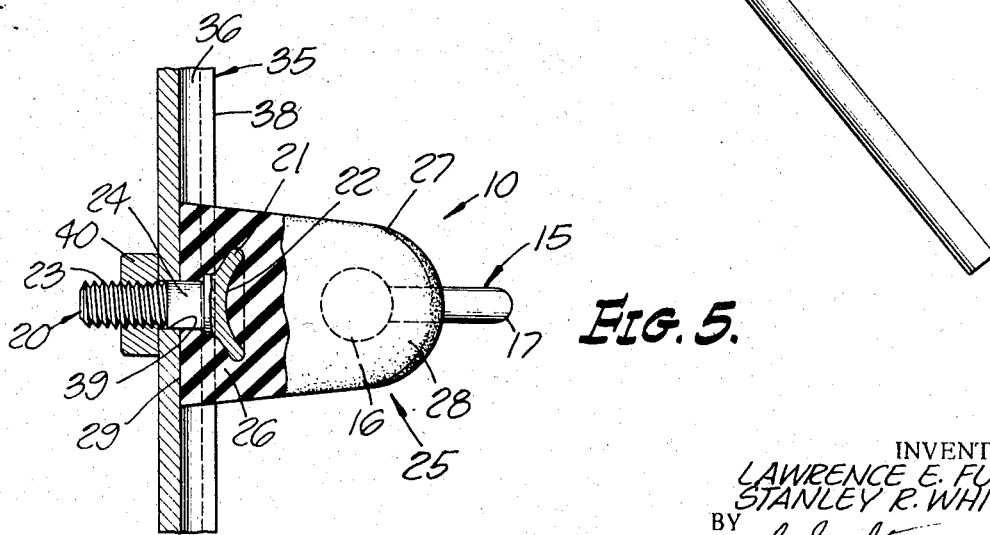

Filed Aug. 28, 1968   2 Sheets-Sheet 1

INVENTORS.
LAWRENCE E. FULLER
STANLEY R. WHITE
BY
ATTORNEY

United States Patent Office 3,561,206
Patented Feb. 9, 1971

3,561,206
HARVESTER TINE
Lawrence E. Fuller, Whittier, and Stanley R. White, Paramount, Calif., assignors to Byron Jackson Inc., Long Beach, Calif., a corporation of Delaware
Filed Aug. 28, 1968, Ser. No. 756,041
Int. Cl. A01d 77/00
U.S. Cl. 56—400                                12 Claims

ABSTRACT OF THE DISCLOSURE

A tine for use in hay balers and the like having a finger portion and an attachment portion, the two portions being joined by a flexible connection comprising elastomeric material so as to provide an elastic resistance to drag and shocks as the pick-up fingers convey the hay into the baling machine.

BACKGROUND OF THE INVENTION

Field of the invention

This invention relates to tines or pick-up fingers as applied to harvesters for handling mowed hay, the tines generally being disposed in circumferentially spaced rotating rows for contact with the cut hay in the field. The invention relates more particularly to harvester tines used in hay balers, a digitate drum of axially spaced circumferential rows of tines rotating in meshed contact with the windrows of mowed hay as the baler travels forward, to pick up the hay and deposit it onto the cross-feed deck of the hay baler preparatory to baling.

Description of the prior art

Tines for handling hay and intended to provide flexibility and resilience are extant in the prior art. Examples are that disclosed in United States Letters Pat. No. 2,712,723 issued July 12, 1955 to K. P. Ryan, showing a tine of spring steel wire construction, the spring steel providing the elasticity; and also United States Letter Pat. No. 3,096,609 issued July 9, 1963 to J. E. Garrett et al., disclosing a tine with a wire finger and a connection to the mounting bar including elastomeric material to provide for flexibility. The primary deficiencies of harvester tines of the prior art are excessive stiffness and inadequate flexibility, resulting in shocks and damage when rocks and other obstructions are encountered; and in loss of leaves and grain from the hay as it is being picked up.

SUMMARY OF THE INVENTION

In order to overcome the shortcomings heretofore encountered in baler pick-up tines, therefore, it is a primary object of this invention to provide a tine which has the characteristics of both optimum rigidity and optimum elasticity.

Another object of the invention is to provide a tine of increased service life by reducing stress in the elastomeric flexible joint.

An additional object of this invention is to provide a tine with substantially uniform stress in its operating positions, and not easily damaged.

A further object of the invention is to provide for quick and easy mounting and removal of the tine, resulting in a minimum of maintenance time required for servicing.

Briefly, the invention resides in a harvester tine for picking up mowed hay, which includes: a rigid finger having one end, and another end for enmeshing contact with the mowed hay; fastener means for securing the tine to a mounting bar and having one end; and a resilient joint comprising elastomeric material, and having embedded and adhesively bonded therein the one end of the finger and the one end of the fastener means. The improvement in the tine comprises one of the one ends having a convex surface and the other of the one ends having a concave surface facing the convex surface with a portion of the elastomeric material therebetween so that the surfaces substantially maintain their spaced relationship as the resilient joint is flexed by angular movement of the finger relative to the fastener means.

BRIEF DESCRIPTION OF THE DRAWINGS

FIG. 5 is a view, partially in section and on the same scale of the mounted tine of FIG. 3, taken on the line 5—5, and looking in the direction of the arrows;

FIG. 6 is a sectional view, on the same scale as FIG. 2, of a modified form of tine in accordance with the invention; and FIG. 7 is a sectional view, on the same scale as FIG. 2, of another modified form of tine in accordance with the invention.

DESCRIPTION OF THE PREFERRED EMBODIMENTS

Figure 1:
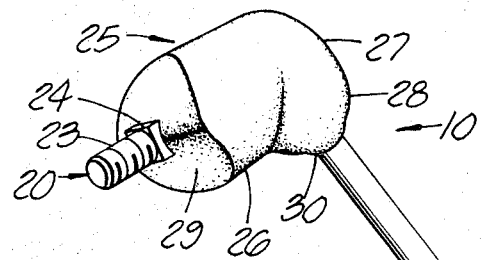
FIG. 1 is a perspective view of a tine exemplary of the invention.
Figure 2:
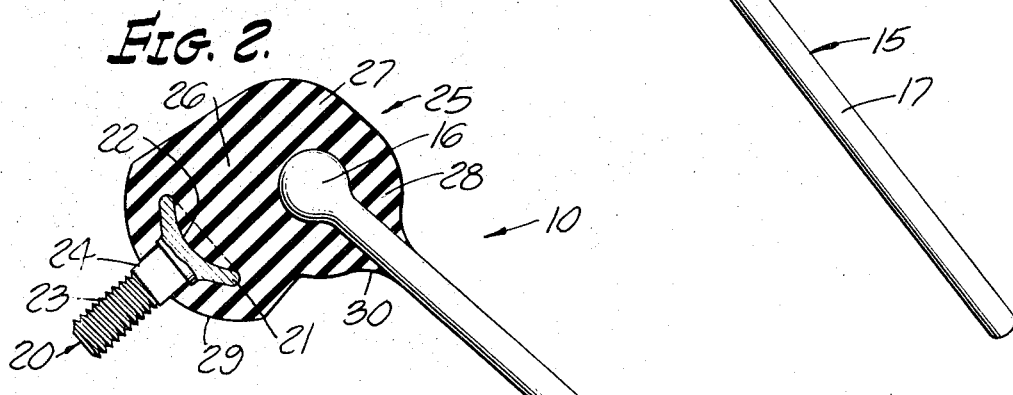
FIG. 2 is a sectional view, on an enlarged scale, of the tine of FIG. 1.

In FIGS. 1 and 2 is shown a hay harvester tine 10 which includes a finger 15 with a stem or tooth portion 17; a fastener bolt 20 with a threaded shank portion 23 and a square shank portion 24; and a flexible joint 25 connecting the finger 15 with the fastener 20, and having a base portion 26 with a cylindrical surface 29, a crown portion 27 blending with the base portion 26 and a shoulder portion 28, the latter blending into the stem 17 of the finger 15 with a fillet at the junction of mergence 30. The sectional view, FIG. 2, shows also the generally spherical head 16 of the finger 15 embedded in the flexible joint 25, as is the head 21 of the fastener bolt 20 with its spherically cup-shaped surface 22 facing the head 16 of the finger 15. The concave surface 22 may be spherical as shown, or include variant shapes, such as conical, or spherical at the bottom blending into conical at the edges.

Figure 3:
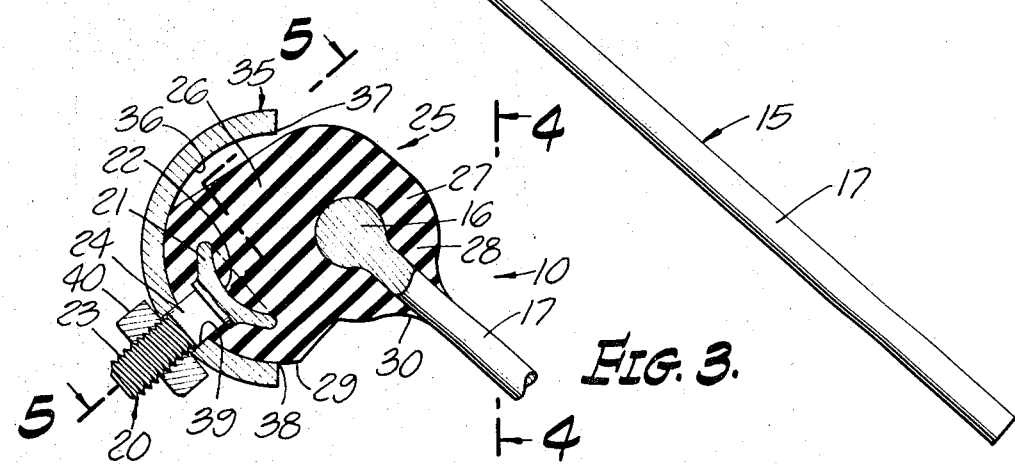
FIG. 3 is a sectional view of a portion of the tine, on the same scale as FIG. 2, showing the tine assembled to a mounting bar, also in section.
Figure 4:
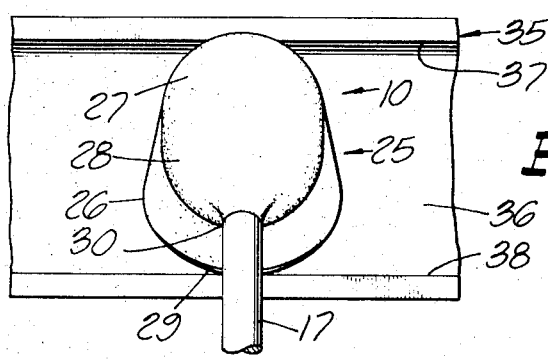
FIG. 4 is an elevational view of the mounted tine of FIG. 3, on the same scale, taken on the line 4—4 and looking in the direction of the arrows.

In FIGS. 3, 4 and 5 the tine 10 is shown attached by means of a nut 40 to a mounting bar 35, the curved bottom surface 29 engaging the curved inner surface 36 of the semicylindrical mounting bar 35 so that there is clearance between the flexible joint 25 and the upper edge 37 of the bar 35, and the cylindrical bottom surface 29 of the joint 25 slightly overhangs the bottom edge 38 of the bar 35. The square portion 24 of the fastener bolt 20 complementarily engages and passes through a square hole 39 in the bar 35, and the nut 40 screwed onto the thread 23 secures the tine 10 to the mounting bar 35.

In FIG. 6 is depicted a modified form of the tine, designated 10a, which includes a finger 15a with a stem portion 17a; a fastener bolt 20a with a threaded shank portion 23a and a square shank portion 24a; and a flexible joint 25a connecting the finger 15a with a fastener 20a, and having a base portion 26a with a cylindrical bottom surface 29a, and a crown portion 27a blending into the base portion 26a and into the stem 17a of the finger 15a with a fillet at the junction 30a. The generally spherical head or ball 16a of the finger 15a is embedded in the flexible joint 25a, as is the head 21a of the fastener bolt 20a, which has a spherically cup-shaped surface 22a facing the ball head 16a of the finger 15a.

FIG. 7 depicts a second modified form of the tine, designated 10b, which includes a finger 15b with a stem portion 17b having a bend 18b; a fastener bolt 20b with a threaded shank portion 23b and a square shank portion 24b; and a flexible joint 25b connecting the finger 15b with the fastener 20b, and having a base portion 26b with a cylindrical bottom surface 29b, and a crown portion 27b blending into the base portion 26b and into the stem 17b with a fillet at the junction 30b. The ball or generally spherical head 16b of the finger 15b is embedded in the flexible joint 25b, as is the head 21b of the fastener bolt 20b, which has a concave or spherically cup-shaped surface 22b facing the ball head 16b of the finger 15b.

In one typical configuration exemplary of the embodiment of the tine 10 as shown in FIG. 2, substantially covering the outer peripheral surfaces of the ball head 16 of the finger 15 and the bolt head 21 is one-fourth inch of the elastomer of the joint 25, and between the facing or complemental surfaces 16 and 22 three-fourths of an inch of elastomer; the stem 17 of the finger 15 extends six inches outward from its mergence 30 with the joint 25 at an angle of 98° from the axis of the fastener bolt 20; the diameter of the ball head 16 is one-half inch and of the bolt head 21 seven-eigths inch, cupped generally spherically concave at the facing surface 22 with a half-inch radius, the center of the latter being on the axis of the bolt 20 and the center of the ball 16 eccentric one-fourth inch laterally from the axis of the bolt 20.

In order to provide resilience and good flexing characteristics in the joint 25, 25a, 25b it has been determined that an elastomeric coverage thickness over the ball 16, 16a, 16b and the disc 21, 21a, 21b should be on the order of one-half to three times the radius of the ball 16, 16a, 16b; and the thickness of elastomer between the concave surface 22, 22a, 22b of the disc 21, 21a, 21b and the complemental surface of the ball 16, 16a, 16b should be on the order of two to five times the radius of the ball. There is thus provided for a ball having a radius of one-quarter inch a coverage of elastomer ranging substantially from one-eighth to one-half inch and a complementary disc-to-ball surface spacing ranging substantially from three-eighths to one inch. These are practical ranges which may be varied in either direction, and are not intended to restrict the dimensional relationships of the tines.

In a typical installation and use of the tines 10, as depicted in FIGS. 1 to 5, for use as resilient, shock-absorbing pick-up fingers for transferring mowed and raked hay from windrows onto the cross-feed deck or table of a hay balter, the tines 10 are mounted for rotation near the forward end of the traveling baler for enmeshing contact with the hay as the machine travels along the windrow. A series, generally four, of parallel and circumferentially spaced mounting bars 35 is driven by spaced mounting wheels to which they are attached and adapted to travel in a cylindrical path, the axis of the latter being perpendicular to the windrow. The mounting bars 35 are substantially semicylindrical in cross-sectional shape, as may be seen in FIG. 3, with a top edge 37 and a bottom edge 38, and a series, generally about a dozen, or square holes 39 equally spaced along the cylindrical surface 36 of the mounting bar 35 and located substantially 53° from its bottom edge 38. At each of the holes 39 is secured a tine or pick-up tooth 10, the curved surface 29 of the latter complementarily engaging the curved surface 36 of the bar 35 and the square portion 24 of the shank of the fastener bolt 20 complementarily engaging the square hole 39 to assure proper orientation of the finger 15, disposed at an obtuse angle from the fastener bolt 20, the tine 10 being fastened by means of a nut 40 screwed onto the thread 23. No lock washer is required, because the resilience of the elastomeric material or rubber between the bolt head 21 and the bar surface 36, as the rubber tends to be compressed, exerts a biasing force which provides tension in the threads, tending to keep them tight. The tine 10 is disposed so that the finger 15 is oriented to point into and enmesh the hay to pick it up, the direction of travel of the tine 10 being forward as it rotates in a circular path with the bar 35 toward the ground and the windrow to enmesh the hay with the finger portion 17 to lift it in a forward circular path for deposit on the cross-feed deck, the finger 15 then retracting downward through one of a series of parallel slots in the deck to repeat the circuit. It is important that the tines 10 be aligned properly to penetrate the hay, lift it, and retract from it at the proper angle. and that they be also flexible enough to resist shocks and snags, a primary objective being to gather the hay effectively without loss of nutritive leaves and grain. In order to provide the proper orientation for engaging, lifting, and releasing the hay, the tine 10 is constructed with somewhat greater than a right angle or 90° to 110° between the axes of the finger 15 and the fastener bolt 20, but preferably 98°, which, with the angle of 53° between the bottom edge 38 and the mounting hole 39 of the mounting bar 35 thus provides substantially 45° between the stem 17 and the edge 38, the tine 10 in operation tending to rotate or flex in the direction of the edge 38 so that there is no possibility of interference as the tine 10 reflexes toward the bar 35.

The cupped end portion 22 of the bolt head 21 and the ball end 16 of the hay pick-up finger 15 are so related to one another that there is established between the complementarily facing surface portions of the two ends 22 and 16 a substantially uniform resilient elastomer or rubber thickness between corresponding portions of the two surfaces, so as to assure a substantially uniform stressing and resultant rigidity as the finger 15 is flexed. This is further assured by providing a substantially uniform coverage of rubber, preferably a minimum of one-eighth inch in the joint 25 in which the head 21 of the bolt 20 and the ball-head 16 of the finger 15 are embedded and bonded, provided by the elastomeric joint 25 having a conical base portion 26 with a substantially cylindrical bottom surface 29, the portion 26 blending conoidally to a spherical crown portion 27, and the portions 26 and 27 blending in the direction of the stem 17 into a spherical shoulder portion 28, connected to the stem 17 by a fillet portion at the mergence 30. As thus embedded in the flexible joint 25, the stationary fastener head cup 22 and the finger ball-head 16, spaced preferably at least three-eighths inch apart, retain the relative space relationship of their complementarily facing portions as the pick-up tooth 15 is flexed in operation, thus assuring substantially uniform and optimum flexibility of the tine member 10. As may be seen in FIGS. 4 and 5, when the tine 10 is in operation, the stem 17 tending to rotate or flex toward the edge 38 of the bar 35, the greater the spacing and the extent of the flexible elastomeric rubber material between the bolt head 21 and the junction 30, the freer will be the movement of the stem 17 and the greater the flexibility. Thus, making more obtuse the angle between the axes of the bolt 20 and the finger 15 at its mergence 30, or moving the ball 16 of the finger 15 away from the axis of the bolt 20 along the axis of the stem 17, increases the spacing of the fillet junction 30 from the bolt head 21, resulting in more flexibilty. Conversely, less flexibility or more stiffness would result from the opposite relationships.

The installation and use of the modified form of the invention, tine 10a as depicted in FIG. 6, is quite similar and has the same advantages as the tine 10 described above, except that it is formed to provide more stiffness, the ball portion 16a of the finger 15a being in axial alignment with the fastener bolt 20a, so that the spacing of the stem fillet at the junction 30a is closer to the head 21a of the bolt 20a.

The installation and use of the second modified form of the invention, tine 10b as depicted in FIG. 7, is quite similar and has the same advantages as the tines 10 and 10a described above, except that it is formed to provide more flexibility, the ball portion 16b of the finger 15b being in axial alignment with the fastener bolt 20b as in tine 10a, but the stem 17b of the finger 15b is provided with a bent portion 18b, allowing the stem to be extended from the flexible joint 25b at a more obtuse angle relative to the bolt 20b, of the magnitude of 125° to 145°, but preferably substantially 135°. Thus there is provided more rubber and distance between the fillet at the junction 30b and the bolt head 21b, allowing freer flexing of the pick-up tooth 15b.

While the description above refers primarily to the use of the tines of this invention as applied to hay balers, they may be applied with similar advantages in other installations, such as for hay rakes and different harvesting equipment in which flexible pick-up and handling fingers are used. Additionally, while three forms of the invention have been shown and described, minor changes could be made without departing from the scope of the claims of this invention.

We claim:

1. A harvester tine for picking up mowed hay including:
   (a) a rigid finger having one end, and another end for enmeshing contact with the mowed hay;
   (b) fastener means for securing the tine to a mounting bar and having one end; and
   (c) a resilient joint comprising elastomeric material, and having embedded and adhesively bonded therein said one end of said finger and said one end of said fastener means;
   wherein the improvement comprises:
      one of said one ends having a convex surface and the other of said one ends having a concave surface facing said convex surface with a portion of said elastomeric material between said surfaces so that said surfaces substantially maintain their spaced relationship as said resilient joint is flxed by angular movement of said finger relative to said fastener means.

2. A harvester tine as defined in claim 1 wherein:
   (a) said convex surface defines a substantially spherical ball having a radius;
   (b) said concave surface defines one side of a substantially spherically-cupped disc having a radius; and
   (c) said surfaces being in complemental spaced relationship in said resilient joint.

3. A harvester tine as defined in claim 2 wherein:
   (a) said ball comprises one end of said finger; and
   (b) said cupped disc comprises one end of said fastener means.

4. A harvester tine as defined in claim 3 wherein:
   (a) said fastener means comprises a bolt having a longitudinal axis;
   (b) said cupped disc comprises the head of said bolt; and
   (c) said finger defining an axis such that the axis of said finger and the axis of said bolt are at an obtuse angle to one another.

5. A harvester tine as defined in claim 2 wherein:
   (a) said elastomeric material of said joint covering said ball and said disc has a thickness from one to three times the radius of said ball; and
   (b) said surfaces are spaced complementally with a thickness of said elastomeric material therebetween from two to five times the radius of said ball whereby to provide for substantially uniform flexibility of said finger relative to said fastener means.

6. A harvester tine as defined in claim 2 wherein:
   (a) said ball and said disc are covered in said joint by from one-eighth to one-half inch of said elastomeric material; and
   (b) said surfaces are spaced complementally with from three-eighths to one inch of said elastomeric material of said joint therebetween so as to provide for substantially uniform flexibility of said finger relative to said fastener means.

7. A harvester tine as defined in claim 4 wherein:
   the axis of said finger at the mergence of said finger from said resilient joint is disposed at an angle of from 90° to 110° from the axis of said bolt, so as to provide sufficient elastomeric material between said mergence and said head of said bolt to allow for flexing of said resilient joint by angular movement of said finger toward said head of said bolt.

8. A harvester tine as defined in claim 4 wherein: the axis of said finger at the mergence of said finger from said resilient joint is disposed at an angle of substantially 98° from the axis of said bolt.

9. A harvester tine as defined in claim 4 wherein: the axis of said finger at the mergence of said finger from said resilient joint is disposed at an angle of 125° to 145° from the axis of said bolt so as to provide adequate elastomeric material between said mergence and said head of said bolt for enhanced flexibility of said resilient joint for angular movement of said finger toward said head of said bolt.

10. A harvester tine as defined in claim 4 wherein: the axis of said finger at the mergence of said finger from said resilient joint is disposed at an angle of substantially 135° from the axis of said bolt.

11. A harvester tine as defined in claim 4 wherein: said ball is disposed eccentrically from the axis of said bolt so as to provide additional elastomeric material between said head of said bolt and the mergence of said finger from said resilient joint for enhanced flexibility of said resilient joint for angular movement of said finger.

12. A harvester tine as defined in claim 4 wherein: said ball is disposed concentric with the axis of said bolt so as to reduce the spacing and the amount of said elastomeric material between said head of said bolt and the mergence of said finger from said resilient joint for enhanced rigidity of said resilient joint to resist angular movement of said finger.

References Cited
UNITED STATES PATENTS

| | | | |
|---|---|---|---|
| 3,031,835 | 5/1962 | Gustafson | 56—400 |
| 3,226,922 | 1/1966 | Luther et al. | 56—400 |

ROBERT PESHOCK, Primary Examiner